United States Patent [19]
Kuntz

[11] 3,741,624
[45] June 26, 1973

[54] PROJECTOR DEVICE FOR DRAWING

[76] Inventor: Charles H. Kuntz, 340 Great Oaks Drive, Dayton, Ohio 45403

[22] Filed: Aug. 4, 1971

[21] Appl. No.: 168,862

[52] U.S. Cl. .................................. 350/121, 353/78
[51] Int. Cl. ......................................... G03b 21/56
[58] Field of Search .................. 350/121, 122, 123; 353/72, 73, 78, 79

[56] References Cited
UNITED STATES PATENTS

| | | | |
|---|---|---|---|
| 3,199,403 | 8/1965 | Moore | 350/123 X |
| 3,536,390 | 10/1970 | Dine et al. | 353/78 X |
| 3,560,088 | 2/1971 | Schwartz | 353/78 |
| 3,381,574 | 5/1968 | Wells | 353/78 X |
| 3,457,008 | 7/1969 | Lacol, Jr. | 353/78 X |
| 2,562,297 | 7/1951 | Cordonnier | 353/79 |
| 2,543,561 | 2/1951 | Tracy | 353/78 |
| 2,659,267 | 11/1953 | Baule | 350/121 |

Primary Examiner—Samuel S. Matthews
Assistant Examiner—Richard M. Sheer
Attorney—Jerome P. Bloom

[57] ABSTRACT

A device receiving projected light images and reflecting them through a transparent work table from the underside. A user of the device mounts a work sheet on the top surface of the table and uses the image projected therethrough to depict a like image, or portions of it, on the work sheet. The device includes an adjustable mirror for enabling the user to obtain a direct view of the projected image when desired.

6 Claims, 3 Drawing Figures

PATENTED JUN 26 1973 3,741,624

INVENTOR
CHARLES H. KUNTZ
BY Jerome P Bloom
ATTORNEY

PROJECTOR DEVICE FOR DRAWING

BACKGROUND OF THE INVENTION

This invention relates to drawing aids useful to amateur and professional artists and draftsmen, and has particular reference to devices displaying projected light images under conditions facilitating tracing or copying by a user of the device.

Hobbiests and aspiring artists have available relatively few aids to assist their efforts at sketching, drawing and painting. Preprinted coloring books and "paint by number" sets are largely mechanical and provide unsatisfactory opportunity for an exercise of artistic effort. Moreover, they offer limited subject matter. "Pictures" must be individually bought and have no utility other than as a prepared, unfinished art work. Trained or professional artists may also find drawing aids useful, as in achieving a correct composition and in identifying and applying precise shades of color. No device serving these purposes appears in the known prior art, and certainly none embodying the means to meet requirements of both the amateur and professional artist.

SUMMARY OF THE INVENTION

A device according to the present invention operates in conjunction with a slide projector. It accordingly has great flexibility in respect of displayed images in that any projectable picture, drawing or the like in slide form is available for use. In a preferred embodiment, the invention provides a cabinet the top of which is constructed to serve as a drawing table. Inset in the table is a pane of clear glass or other transparent material. A work sheet is suitably positioned to the work table and a projected light image is directed into the cabinet through an opening in a lower part thereof. Within the cabinet a system of mirrors acts as a transmission means for the projected image which finally is reflected upon the underside of the transparent inset on the work table. The image is visible through the work sheet and a user of the device can follow the projected image to a greater or lesser extent in depicting a corresponding image on the work sheet. Disposed in an intermediate position in the cabinet and adjustable from outside the cabinet is other mirror means which the user can operate to view the transmitted image so that for reference purposes he may have a direct reflection of the image as distinguished from the indirect view obtained through a mounted work sheet.

An object of the invention is to provide an image display device useful as a drawing aid to amateur and professional artists and the like.

Another object of the invention is to provide an image display device operable in conjunction with a slide projector but having an independent, unitary existence.

A further object of the invention is to provide an image display device of simple construction utilizing a transparent work table through which light images may be projected as an aid to a user of the device in tracing, copying or otherwise utilizing the projected image or portions thereof.

Still another object of the invention is to incorporate in an image display device means to obtain a direct view of the projected image as a reference in executing the copying, tracing or like work.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings, wherein is shown one but obviously not necessarily the only form of embodiment of the invention;

DESCRIPTION OF PREFERRED EMBODIMENT

Figure 1:
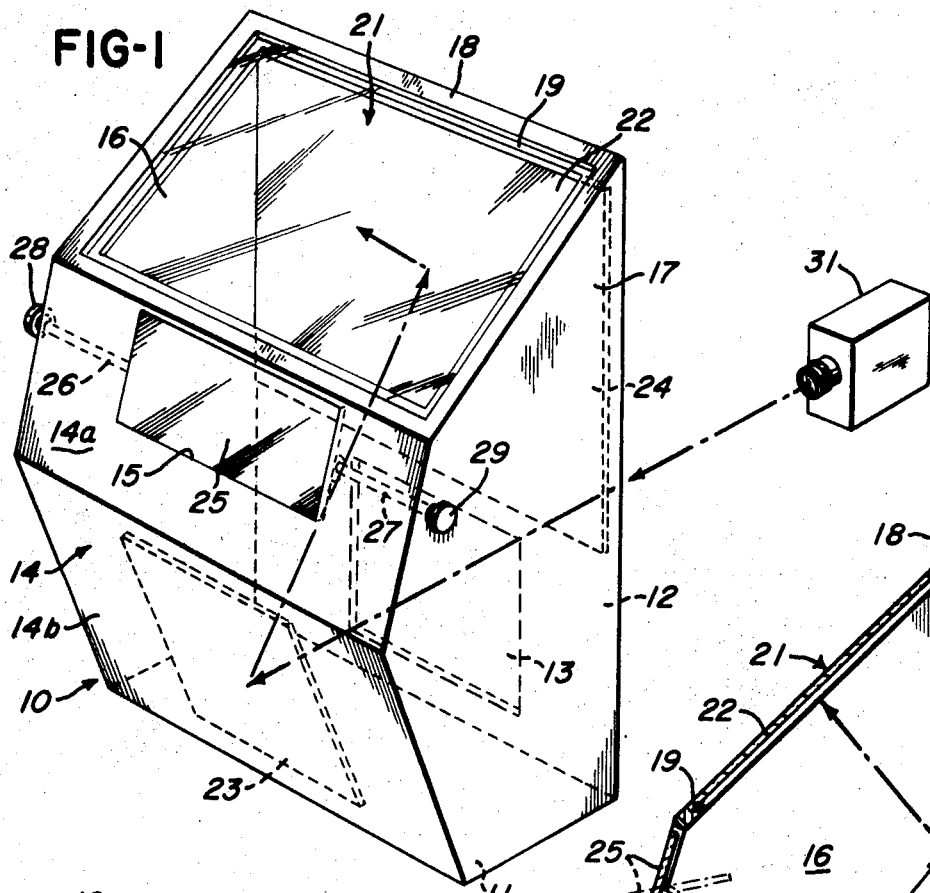
FIG. 1 is a view in perspective showing an image display device in accordance with the illustrated embodiment of the invention.

Referring to the drawings, a display device in accordance with the illustrated embodiment of the invention comprises a cabinet 10. The cabinet is a free standing structure having a flat planar floor section 11 of rectangular configuration. A back wall 12 of the cabinet rises vertically from what may be considered a rear edge of the floor 11 and throughout its length is straight or perpendicular to the cabinet floor. In the wall 12 near the bottom thereof is an opening 13. A front wall 14 of the cabinet is comprised of upper and lower sections 14a and 14b which have a converging-diverging relation to one another. Lower wall section 14b rises upwardly from what may be considered the front edge of floor 11 and slopes in a direction forwardly of or away from rear wall 12. Upper section 14a is a continuation of lower wall section 14b and inclines rearwardly thereof or in the direction of rear wall 12. In the upper wall section 14a is a laterally elongated opening 15. Completing the structure of the cabinet are side walls 16 and 17.

The several walls and wall sections comprising the cabinet are joined together at contiguous edges, suitable provision being made, as may be required, for hinging of selected portions to provide for access to the cabinet interior. The bottom of the cabinet is closed, as noted, by a floor 11 unitarily joined to the several panels defining the front and rear walls and the side walls. At the top of the cabinet is a frame 18 provided as for example, by strips of molding suitably fixed to upper edges of the cabinet walls. The frame 18 is constructed with an interior lip 19. Inset in the opening defined by the frame and seating on lip 19 is insert means 21 comprised in the main of a flat pane 22 of clear glass. The pane 22 is relatively thick so that it may function as a work surface. Together, frame 18 and insert means 21 comprise a work table. The back wall 12 is elevated relatively to front wall 14 so that the work table occupies a position declining toward the front of the cabinet, as illustrated.

The walls of the cabinet device define an enclosure. Within such enclosure is a system of mirrors including a mirror 23 fastened flush to the lower section 14b of the front wall 14. The mirror 23 is substantially aligned with back wall opening 13. Also forming a part of the system of mirrors is a mirror 24 mounted flush to the back wall 12 above opening 13. The arrangement is one in which light images directed into the cabinet interior through opening 13 strike mirror 23 and are reflected thereby to mirror 24 which in turn reflects such images to the under side of the work table and in particular to the transparent work surface 22 inset therein. Additional mirror means is provided in the form of a mirror 25 having a configuration to be received in and substantially to close opening 15 in the upper wall section 14a of the front wall 14. The mirror 25 is mounted at its ends to shafts 26 and 27 having respective bearings in side walls 16 and 17. At their outer ends shafts 26 and 27 project through and beyond the side walls 16 and 17 and have knobs 28 and 29 attached thereto. The knobs accordingly are accessible for manual rotation, the grasping and turning of either or both knobs serving pivotally to move the mirror 25 within opening 15. Movement of the mirror to an angular position therein, as from the position of FIG. 1 to the position of FIG. 3, tilts the mirror in a manner to be able to view the projected light image within the cabinet enclosure, the projected image being in this manner made available for direct viewing.

Figure 2:
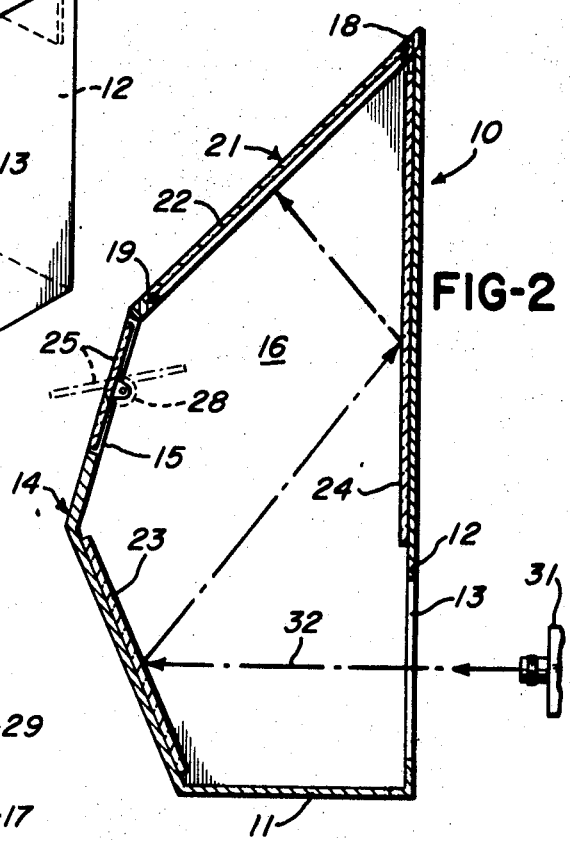
FIG. 2 is a view in longitudinal section through the image display device.
Figure 3:
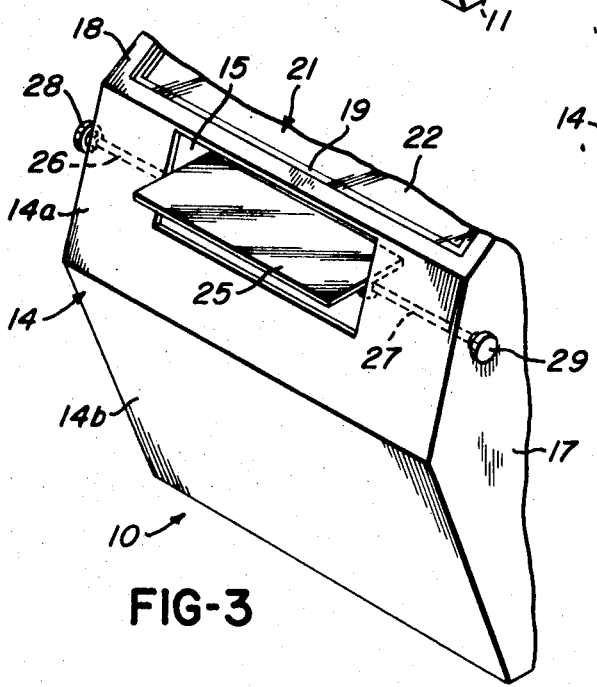
FIG. 3 is a fragmentary front view of the display device, showing the direct viewing mirror means adjusted to a position of use.

In the use of the image display device, a work sheet of translucent quality is placed on the top surface of the work table, substantially centered on pane 22. Preferably, the sheet is taped or otherwise temporarily fixed to the table so that a user may depart from and return to his work without concern over misalignment. A projector, diagrammatically indicated in FIG. 2 at 31, is set up to project its emitted light perpendicularly of the back wall 12 of the cabinet and substantially axially of opening 13 therein. Upon insertion of a selected slide into the projector, the emitted light rays take the form of a light image. This image, as indicated by the broken line path 32, is cast through opening 13 upon mirror 23 and is reflected therefrom upon mirror 24. From the latter, the transmitted image is reflected to the under side of pane 22 and through such pane is visible through the mounted work sheet. The impressed image may be traced or copied by the user of the device, working from above the table either in free hand or with the aid of drawing instruments. The mirror means 25 normally occupies the closed position shown in FIG. 1 and hence is in a non-viewing relation to the projected light image 32. In the event, however, the user of the device wishes to obtain a direct view of the projected image, for reference purposes, he tilts the mirror 25 substantially to a position as shown in FIG. 3. The image is in this instance reflected directly upon the mirror 25 from the image at the underside of the pane 22, affording the user of the device any needed assistance in checking lines, colors, composition and the like at any point when it may no longer be clearly defined on the working surface.

The device accordingly functions to specific advantage in the display of projected color slides or the like in a manner to impress the projected image upon the under side of canvas, paper or other work sheet for sketching, painting or drawing. When working with canvas a clear coating advisedly is applied to obtain a smooth surface. The size of the projected image is varied by changing the distance of the projector 31 from the display device.

It is obvious that the image display device is useful as an improvement over art hobby apparatus heretofore available and further is ideal to the aspiring artist. It provides additionally an outlet for the efforts of untalented persons wishing to sketch, draw or paint. It is helpful, in addition, to the professional artist in arriving at correct composition, proper color and color contrast. The making of hand executed signs from previously typed or preprinted copy on transparent material is ideally suited to the display device.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. An image display device for use as a drawing aid comprising, a cabinet, said cabinet having upstanding front and rear walls, said rear wall being higher than said front wall, means interconnecting said front and rear walls at the upper portions thereof including substantially transparent insert means providing an elevated work surface which is inclined downwardly from said rear wall to said front wall, said work surface being adapted to have mounted thereon a translucent work sheet, means within said cabinet for projecting a light image through said work surface from a point below said work surface and onto such work sheet, such image being visible through such work sheet so that a like-image can be transferred onto such work sheet, said projection means comprising a system of mirrors within said cabinet, one of said mirrors being mounted on the rear wall of said cabinet for reflecting such image through said work surface and onto such work sheet, and mirror means mounted in the front wall of said cabinet at a point below said work surface for reflecting such image from such work sheet to the exterior of said cabinet for enabling direct viewing of such image.

2. An image display device according to claim 1, wherein the front wall of said cabinet has an opening therein at a point below said work surface, said mirror means being a plate-like element received in said opening and being pivotally mounted to tilt to a position closing said opening and to another position angularly of said closing position in which it reflects such image from such work sheet to the exterior of said cabinet.

3. An image display device according to claim 2, including rotatable rod means secured to said plate-like element and accessible from outside said cabinet to effect tilting movements of said plate-like element.

4. An image display device according to claim 1, wherein the rear wall of said cabinet has an opening therein beneath said mirror mounted thereon for receiving such projected light image from an external projection source, said system of mirrors includes a relatively inclined mirror mounted on the front wall of said cabinet opposite said opening for reflecting such image to said mirror mounted on said rear wall, the front wall of said cabinet has an opening therein located at a point below said work surface and above said inclined mirror, said mirror means being mounted in said opening in said front wall in a normally closing relation thereto and being relatively adjustable to reflect such image from such work sheet to the exterior of said cabinet.

5. An image display device according to claim 4, wherein said front wall has an irregular configuration, adjacent portions thereof defining converging-diverging sections, a lower one of said sections mounting said inclined mirror and an upper one thereof having said opening therein.

6. An image display device for use as a drawing aid comprising a cabinet, said cabinet having upstanding front and rear walls, said rear wall being higher than said front wall, means interconnecting said front and rear walls at the upper portion thereof including substantially transparent insert means providing an elevated work surface which is inclined downwardly from said rear wall to said front wall, said work surface being adapted to have mounted thereon a translucent work sheet, said rear wall having an opening therein to admit a projected image within said cabinet, mirror means in said cabinet to reflect such admitted image through said work surface and onto such work sheet, said front wall having an opening therein at a point below said work surface, and other mirror means mounted within said opening in said front wall in a normally closing relation thereto and being adjustable to reflect such image from such work sheet to the exterior of said cabinet for enabling direct viewing of such image.

* * * * *